(12) United States Patent
Beyabani et al.

(10) Patent No.: US 8,341,668 B2
(45) Date of Patent: Dec. 25, 2012

(54) TELEVISION ADVERTISING FOR LOCAL BUSINESSES

(75) Inventors: Syed Zafar Beyabani, Irving, TX (US); Syed Beyabani, Houston, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 825 days.

(21) Appl. No.: 12/270,435

(22) Filed: Nov. 13, 2008

(65) Prior Publication Data

US 2010/0122287 A1    May 13, 2010

(51) Int. Cl.
*H04N 7/10* (2006.01)
*H04N 7/025* (2006.01)

(52) U.S. Cl. ............... 725/35; 725/32; 725/33; 725/34; 725/36

(58) Field of Classification Search ............... 725/32–36
See application file for complete search history.

(56) References Cited

U.S. PATENT DOCUMENTS

| 2002/0133817 A1* | 9/2002 | Markel | 725/23 |
| 2003/0028873 A1* | 2/2003 | Lemmons | 725/36 |

* cited by examiner

*Primary Examiner* — Dominic D Saltarelli

(57) ABSTRACT

A server may select an advertisement based on a location of a set-top box and information relating to television programming to be provided to the set-top box or being provided to set-top box. The server may further provide the selected advertisement to the set-top box for simultaneously displaying with the television programming.

20 Claims, 11 Drawing Sheets

| LOCATION 510 | BUSINESS TYPE 520 | BUSINESS NAME 530 | BUSINESS INFO 540 |
|---|---|---|---|
| 15139 | HARDWARE STORE | MOM AND POP HARDWARE | (555) 555-1212; WWW.LOCAL-WEBSITE.COM |
| LOCATION | TYPE | NAME | INFORMATION |
| LOCATION | TYPE | NAME | INFORMATION |
| LOCATION | TYPE | NAME | INFORMATION |
| ... | | | |
| LOCATION | TYPE | NAME | INFORMATION |

FIG. 5A

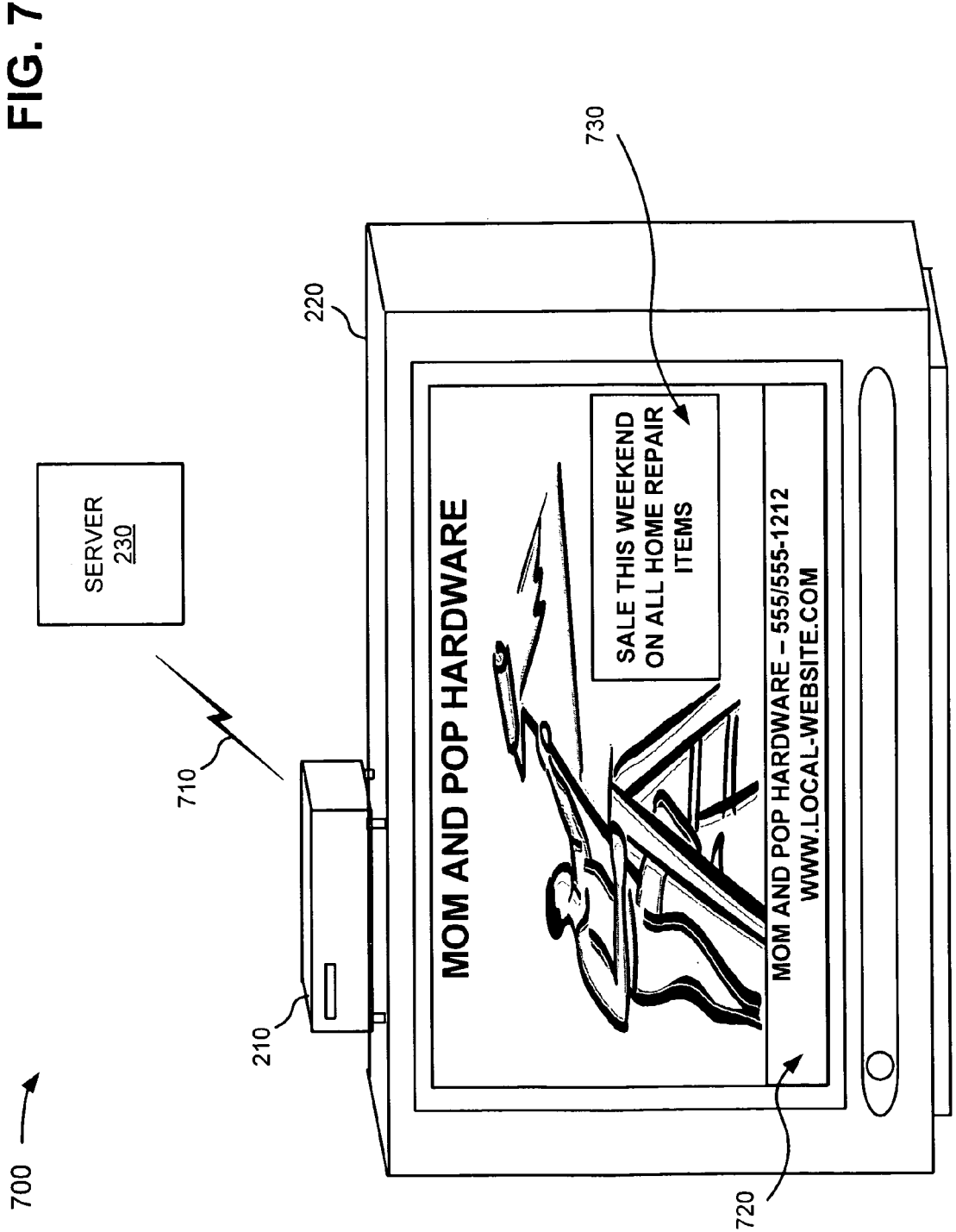

TELEVISION ADVERTISING FOR LOCAL BUSINESSES

BACKGROUND INFORMATION

Television distribution systems, such as fiber optic networks, cable networks, and satellite networks, provide viewers with a large number of television programs. Businesses purchase commercial time to provide television viewers with information regarding the businessess' products and services. These television commercials can be quite expensive. For example, a thirty second commercial during the 2009 Super Bowl is estimated to cost $3 million. Small business owners often cannot afford to purchase commercial time, especially during prime television viewing time and on prime television viewing channels.

BRIEF DESCRIPTION OF THE DRAWINGS

FIGS. 5A-5C are portions of exemplary databases that may be associated with the server of FIG. 2;

FIGS. 7-8B illustrate examples of the processing described in FIG. 6.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
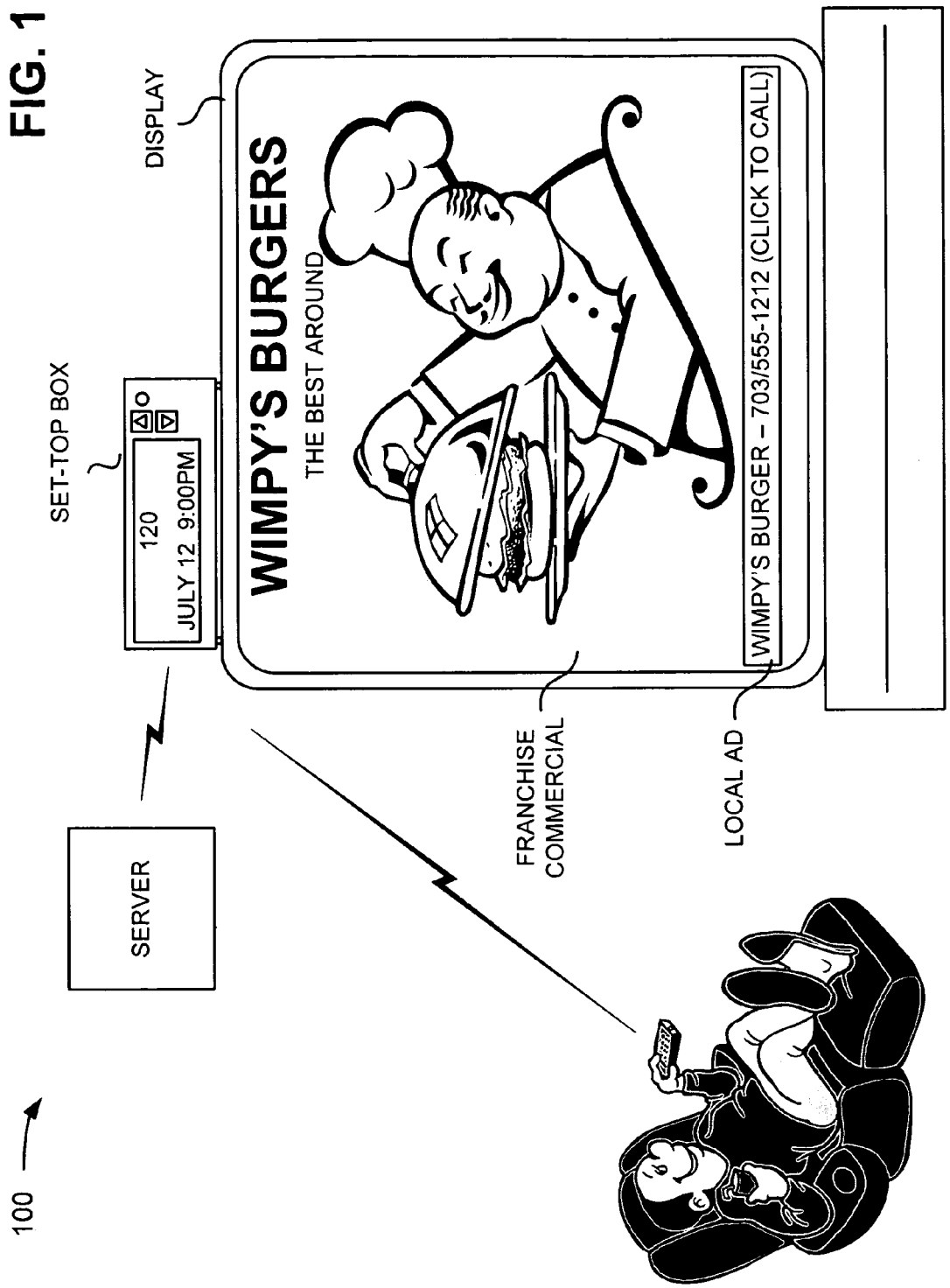
FIG. 1 is an exemplary diagram illustrating a concept described herein.

FIG. 1 is an exemplary diagram illustrating a concept 100 described herein. As illustrated, a set-top box may be associated with a display. In one embodiment, the set-top box may receive television programming (including, for example, television shows, sporting events, movies, commercials, and/or other types of television content) from a server. In one embodiment, the server may cause local business advertisements (also referred to hereinafter as "ads") to be displayed to a user while television programming is displayed to the user.

As illustrated in FIG. 1, for example, while a television commercial for a franchise burger restaurant (i.e., "Wimpy's Burgers") is being provided to a user, the server may cause an ad for a local Wimpy's Burgers restaurant to be provided. The local ad may include information about the local Wimpy's Burgers restaurant, such as a telephone number, an address, a web site address, one or more specials provided at the restaurant, etc. The local ad may be provided in a static manner, as illustrated in FIG. 1, or a dynamic manner in which, for example, the local ad changes, scrolls across the screen, etc. while the commercial is being displayed. The location at which the local ad is provided on the display may be configurable.

In one embodiment, the user may interact with the local ad (e.g., via the set-top box). For example, the user may select the local ad to cause a telephone call to be placed to the local Wimpy's Burgers restaurant, cause a web site for the local Wimpy's Burgers restaurant to be displayed, etc.

Via local ads, small business owners may provide advertising information to television viewers without the need to produce expensive commercials or purchase expensive commercial time. In one embodiment, the small business owners may be charged on a per impression basis (i.e., each time a set-top box causes the small business owners' local ads to be displayed).

Figure 2:
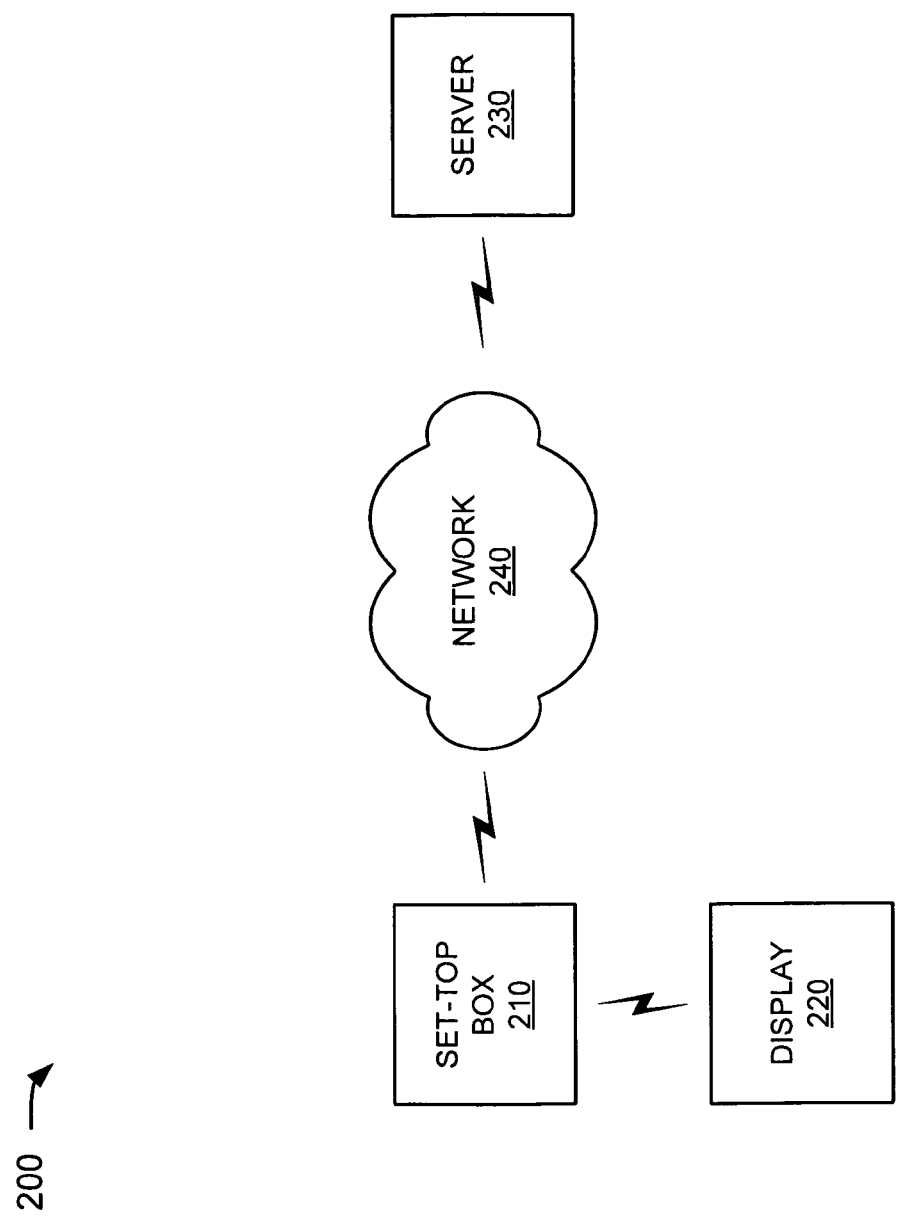
FIG. 2 is an exemplary network in which systems and/or methods, consistent with exemplary embodiments, may be implemented.

FIG. 2 is an exemplary network 200 in which systems and/or methods, consistent with exemplary embodiments, may be implemented. As illustrated, network 200 may include a set-top box 210, a display 220, a server 230, and a network 240. The number of set-top boxes 210, displays 220, servers 230, and networks 240 illustrated in FIG. 2 is provided for simplicity. In practice, there may be more set-top boxes 210, displays 220, servers 230, and/or networks 240. Moreover, in some embodiments, one or more devices in FIG. 2 may perform the functions described as being performed by one or more other devices illustrated in FIG. 2.

Set-top box 210 may include a device that receives television programming and provides the television programming to display 220. Set-top box 210 may further allow a user to alter the television programming provided to display 220 based on a signal (e.g., a channel up or channel down signal) from, for example, a remote control (not shown). In one embodiment, set-top box 210 may cause local ads to be provided to display 220 simultaneously with television programming. Set-top box 210 may also allow a user to interact with the local ads.

Display 220 may include any type of display that is capable of displaying television programming. Display 220 may be implemented as a stand-alone device and/or may be integrated into another device. In one embodiment, some or all of the functions described as being performed by set-top box 210 may be performed by display 220.

Server 230 may include a server entity. An entity may be defined as a device, such as a computer or another type of computation or communication device, a thread or process running on one of these devices, and/or an object executable by one of these devices. In one embodiment, server 230 may receive information from set-top box 210 and may provide information, such as television programming and local ads, to set-top box 210.

Network 240 may include one or more networks of any type, including a Public Land Mobile Network (PLMN), a Public Switched Telephone Network (PSTN), a local area network (LAN), a metropolitan area network (MAN), a wide area network (WAN), a private network, the Internet, an intranet, and/or another type of network.

Figure 3:
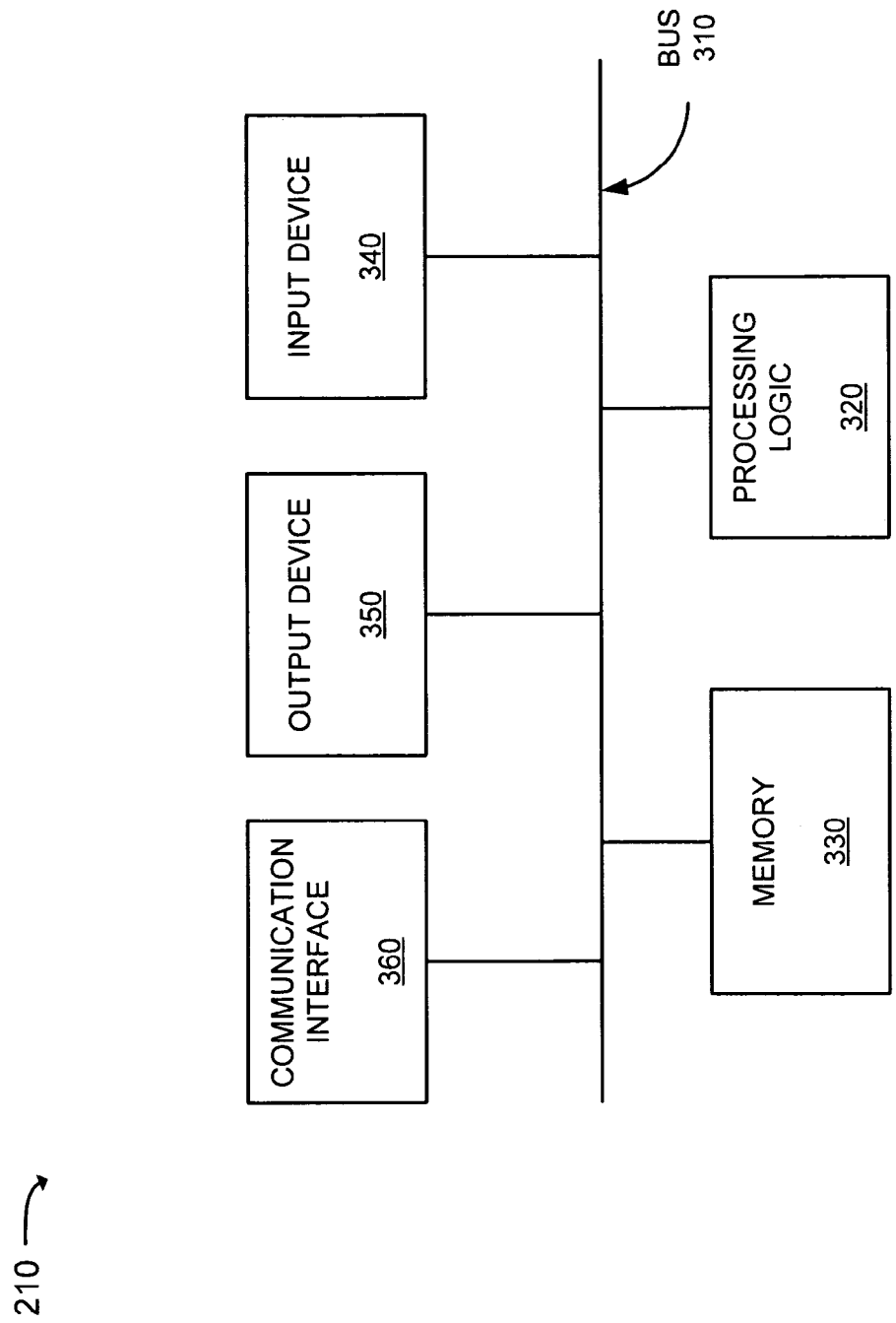
FIG. 3 is an exemplary block diagram of the set-top box of FIG. 2.

FIG. 3 is an exemplary block diagram of set-top box 210. As illustrated, set-top box 210 may include a bus 310, processing logic 320, a memory 330, an input device 340, an output device 350, and a communication interface 360. It will be appreciated that set-top box 210 may include additional (or other) components than illustrated in FIG. 3.

Bus 310 may include a path that permits communication among the elements of set-top box 210. Processing logic 320 may include a processor, microprocessor, or other type of processing logic, such as an application specific integrated circuit (ASIC), field programmable gate array (FPGA), etc., that may interpret and execute instructions. Memory 330 may include a random access memory (RAM) or another type of dynamic storage device that may store information and instructions for execution by processing logic 320, read only memory (ROM) or another type of static storage device that may store static information and instructions for use by processing logic 320, and/or another type of storage device.

Input device 340 may include a mechanism that permits an operator to input information to set-top box 210, such as buttons or a touch-screen interface. Output device 350 may include a mechanism that outputs information to the operator, such as a display. Communication interface 360 may include any transceiver-like mechanism that enables set-top box 210 to receive and/or send information from/to other devices and/or systems, such as display 220, server 230, a remote control, one or more entertainment components (e.g., a speaker, a video recorder, etc.), etc.

As will be described in detail below, set-top box 210 may perform certain operations. Set-top box 210 may perform these, and other operations, in response to processing logic 320 executing software instructions contained in a computer-readable medium, such as memory 330. A computer-readable medium may be defined as a physical or logical memory device.

The software instructions may be read into memory 330 from another computer-readable medium or from another device via communication interface 360. The software instructions contained in memory 330 may cause processing logic 320 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 4:
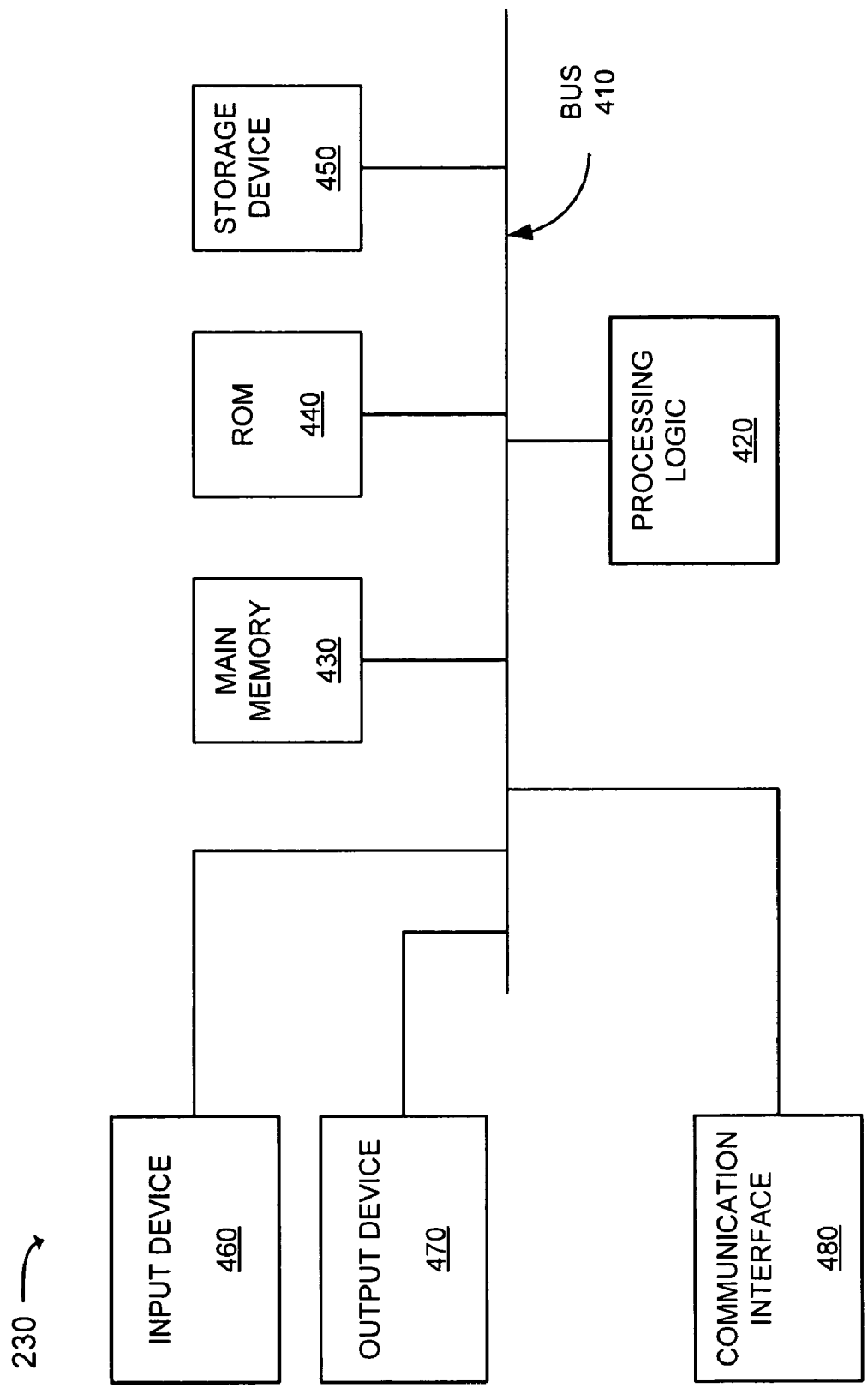
FIG. 4 is an exemplary block diagram of the server of FIG. 2.

FIG. 4 is an exemplary diagram of server 230 according to an exemplary embodiment. As illustrated, server 230 may include a bus 410, processing logic 420, a main memory 430, a ROM 440, a storage device 450, an input device 460, an output device 470, and a communication interface 480. It will be appreciated that server 230 may include additional (or other) components than illustrated in FIG. 4.

Bus 410 may include a path that permits communication among the elements of server 230. Processing logic 420 may include a processor, microprocessor, or other type of processing logic, such as an ASIC, FPGA, etc., that may interpret and execute instructions. Main memory 430 may include a RAM or another type of dynamic storage device that may store information and instructions for execution by processing logic 420. ROM 440 may include a ROM device or another type of static storage device that may store static information and instructions for use by processing logic 420. Storage device 450 may include a magnetic and/or optical recording medium and its corresponding drive.

Input device 460 may include a mechanism that permits an operator to input information to server 230, such as a keyboard, a mouse, a pen, voice recognition and/or biometric mechanisms, a touch-screen interface, etc. Output device 470 may include a mechanism that outputs information to the operator, including a display, a printer, a speaker, etc. Communication interface 480 may include any transceiver-like mechanism that enables server 230 to communicate with other devices and/or systems, such as set-top box 210.

As will be described in detail below, server 230 may perform certain operations. Server 230 may perform these, and other operations, in response to processing logic 420 executing software instructions contained in a computer-readable medium, such as main memory 430.

The software instructions may be read into main memory 430 from another computer-readable medium, such as storage device 450, or from another device via communication interface 480. The software instructions contained in main memory 430 may cause processing logic 420 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

FIG. 5A is a portion an exemplary database 500 that may be associated with server 230. While only one database is described below, database 500 may include multiple databases stored locally at server 230, or stored at one or more different and possibly remote locations.

As illustrated, database 500 may maintain a group of entries in the following exemplary fields: a location field 510, a business type field 520, a business name field 530, and a business information (INFO) field 540. Database 500 may maintain additional or different information (not shown) that aids in identifying a local ad. For example, database 500 may further store information indicating what information is to be provided in a local ad (e.g., telephone number, web site address, physical address, information regarding a sale of one or more items, etc.), one or more time periods at which the local ad may be provided, the manner in which the local ad may be provided (e.g., as a static ad, as a scrolling ad, special effects with which the local ad is to be provided, etc.), and/or other information. Alternatively, some or all of this information may be stored in business information field 540.

Location field 510 may store information that identifies a geographical location of the business identified in business name field 530. The location information may include, for example, a zip code, a city and state, a street address, a set of latitude and longitude coordinates, etc. Business type field 520 may store information that identifies a type (or category) of business for the business identified in business name field 530. In one example, the information in field 520 may be defined broadly, such as "restaurant," or more narrowly, such as "Mexican restaurant." Business name field 530 may store information identifying the name of a business. Business information field 540 may store information relating to the business identified in business name field 510. The information in field 540 may include, for example, a telephone number, a network address (such as a web site address, an electronic mail message address, an instant messenger address, etc.), a physical address, and/or other information relating to the business. As an example, database 500 may store information for a business called "Mom and Pop Hardware," which is a hardware store located in zip code 15139. Database 500 may also store a telephone number (i.e., 555/555-1212) and a web site address (www.local-website.com) for the business.

Figure 5B:
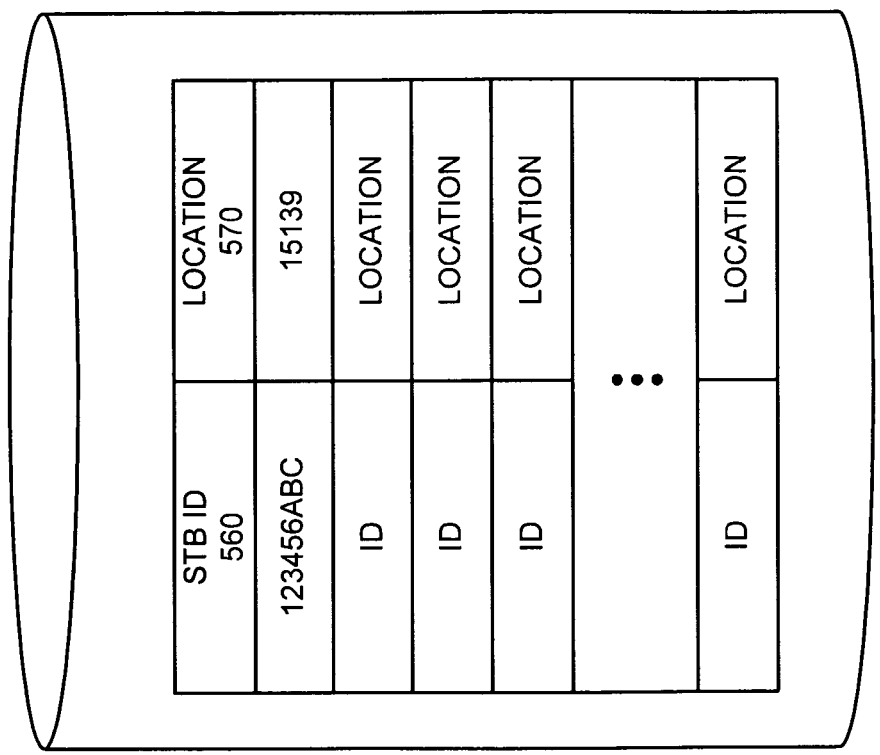

FIG. 5B is a portion another exemplary database 550 that may be associated with server 230. While only one database is described below, database 550 may include multiple databases stored locally at server 230, or stored at one or more different and possibly remote locations.

As illustrated, database 550 may maintain a group of entries in the following exemplary fields: a set-top box (STB) identification (ID) field 560 and a location field 570. Database 550 may maintain additional or different information (not shown) that aids in identifying a location of a set-top box.

Set-top box identification field 560 may store information that identifies a set-top box. The identification information may include a sequence of characters that uniquely identifies a set-top box. Location field 570 may store information that identifies a geographical location of the set-top box identified in set-top box identification field 560. As an example, database 550 may store an entry that indicates that the set-top box, having an identifier of "123456ABC," is located in zip code 15139.

Figure 5C:
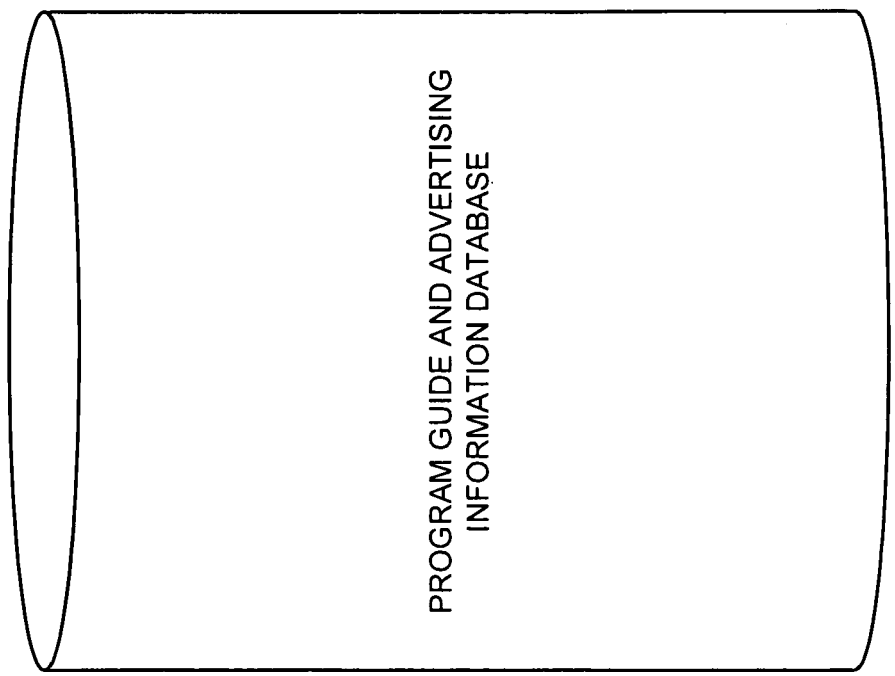

FIG. 5C is a portion of yet another exemplary database 580 that may be associated with server 230. While only one database is described below, database 580 may include multiple databases stored locally at server 230, or stored at one or more different and possibly remote locations.

As illustrated, database 580 may maintain program guide and advertising information. For example, database 580 may store information identifying television programming (e.g., the name of the television programming, a category of the television programming, content of the television programming, etc.) and the time at which the television programming will be provided to users. As indicated above, the television programming may include any type of programming content that may be provided to a set-top box and/or television. Database 580 may store additional information that may aid server 230 in identifying a local ad to provide to a user.

Figure 6:
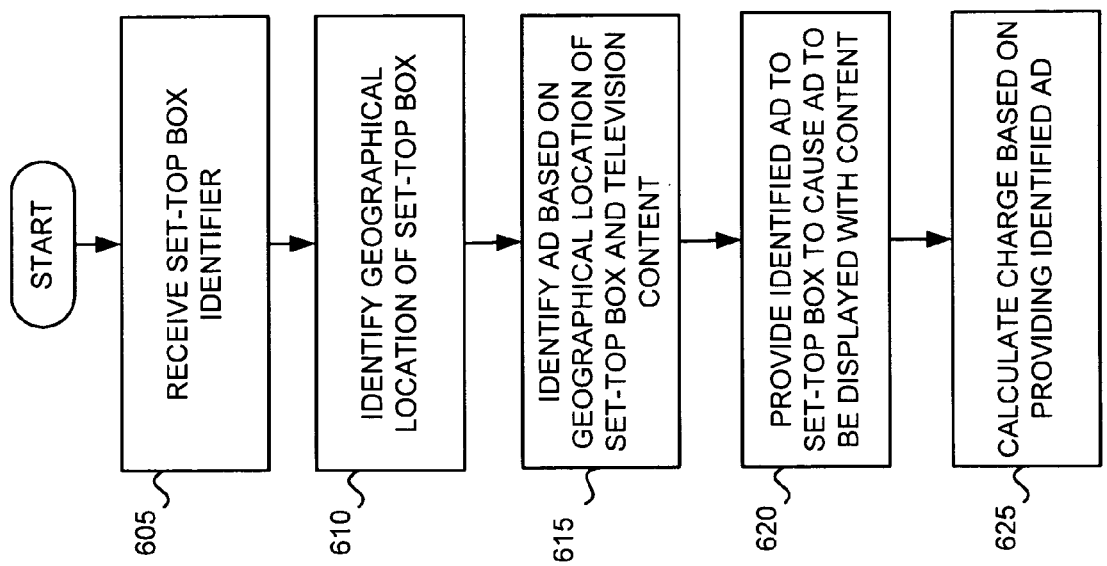
FIG. 6 is a flow chart of exemplary processing for serving local business ads.

FIG. 6 is a flow chart of exemplary processing for serving local business ads. In one embodiment, the processing of FIG. 6 may be performed by server 230. In another embodiment, some or all of the processing of FIG. 6 may be performed by another device or a combination of devices, including or excluding server 230.

Processing may begin with server 230 receiving a set-top box identifier (block 605). In one embodiment, set-top box 210 may transmit the identifier automatically when, for example, set-top box 210 is turned on or at other times. In another embodiment, set-top box 210 may transmit the identifier in response to a command from server 230 or a user.

Server 230 may identify a geographical location of set-top box 210 (block 610). In one embodiment, server 230 may use the received set-top box identifier to obtain the geographical location of set-top box 210. For example, server 230 may access database 550 and, using the received set-top box identifier as an index, may look up the location of set-top box 210 in location field 570.

Server 230 may identify a local ad based on the identified geographical location of set-top box 210 and the television programming being provided or to be provided to set-top box 210 (block 615). In one embodiment, server 230 may use the geographical location of set-top box 210 and information relating to the television programming to identify a local business for which a local ad is to be provided. For example, server 230 may access database 580 to obtain information relating to the television programming that is being provided or will be provided to set-top box 210. The obtained information may include, for example, the name of the business associated with a commercial that is being provided or will be provided, the name of a television show that is being provided or will be provided, the type of television show that is being provided or will be provided (e.g., that the television show is a home repair show), the content of the television show that is being provided or will be provided (e.g., that the television show will be focused on a particular type or make of automobile), and/or other types of information that may used in matching a local ad to the television programming. Server 230 may use the information relating to the television programming and the geographical location of set-top box 210 to select (e.g., from database 500) the local ad. In this way, an ad for a business, which is relevant to the television programming that is being provided or will be provided to set-top box 210, and which is in the geographical vicinity of set-top box 210, may be selected.

The matching of a local ad to television programming may be performed before receiving the set-top box identifier or in near real time as television programming is being provided to set-top box 210. For example, server 230 may match local ads and television programming seconds, minutes, hours, days, weeks, or months before the television programming is to be provided. Alternatively, the programming content may be detected in near real time based on the video stream to be provided to set-top box 210 and/or a text stream that may be associated with the video stream. Thus, server 230 may, for example, in near real time, obtain information relating to television programming to be provided to set-top box 210 and may identify a local ad based on the obtained information.

Server 230 may provide the identified local ad to the set-top box 210 to cause the local ad to be displayed on display 220 (block 620). In one embodiment, server 230 may generate a message and may provide the local ad in the message to set-top box 210. The message may include not only the local ad to be provided, but may also include other information, such as the location on display 220 at which the local ad is to be displayed, the manner in which the local ad is to be displayed (e.g., as a static ad, in a scroll bar, the special effects to be used in displaying the local ad, etc.), and/or other types of information.

Server 230 may calculate a charge for providing the local ad (block 625). In one embodiment, the business with which the local ad is associated may be charged a fixed amount for each ad impression (i.e., each time the ad is provided to a set-top box). In another embodiment, the business with which the local ad is associated may be charged a different amount for ad impressions based on the television programming with which the local ad is provided. Other billing arrangements may alternatively be used.

Figure 8A:
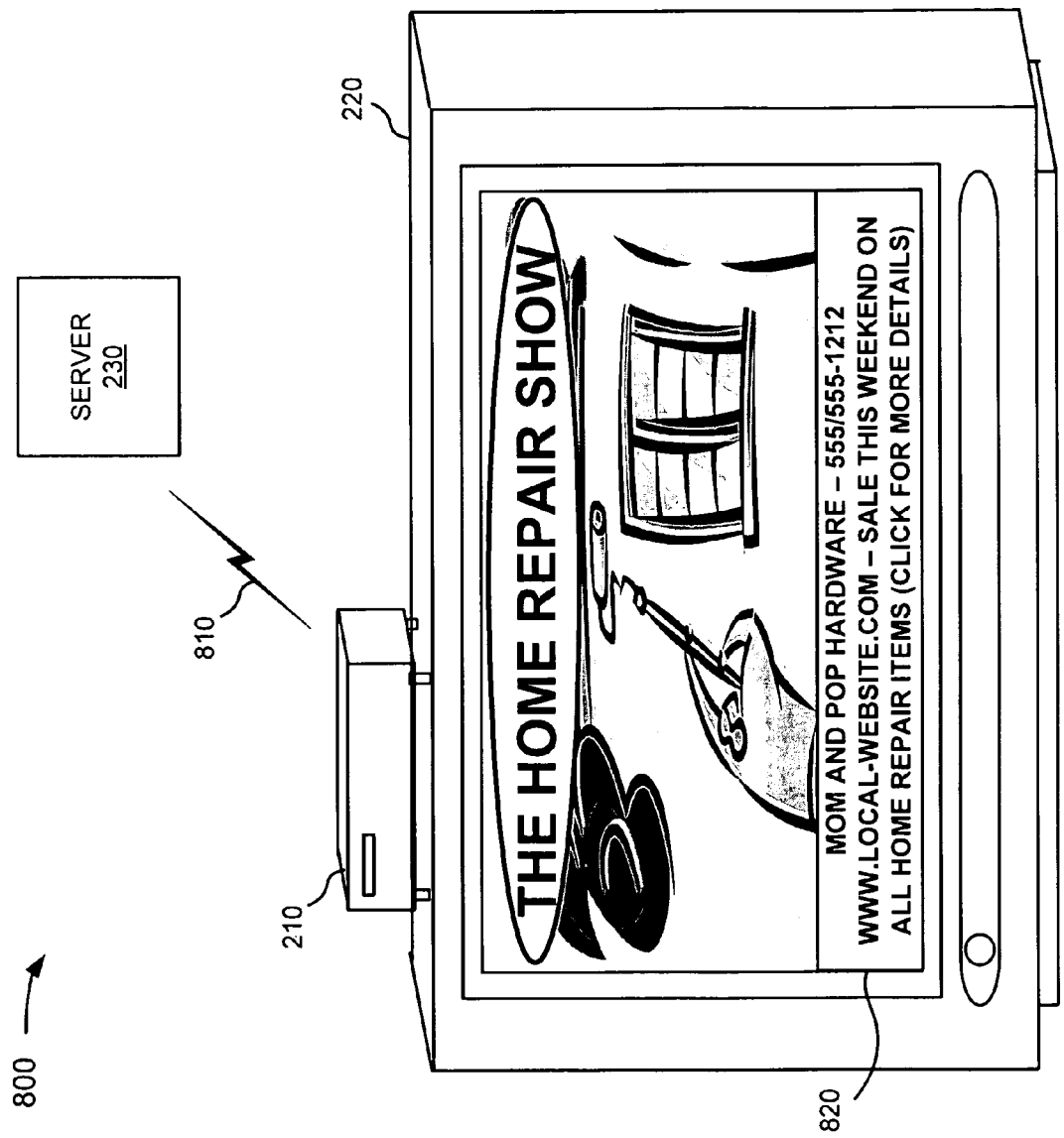
Figure 8B:
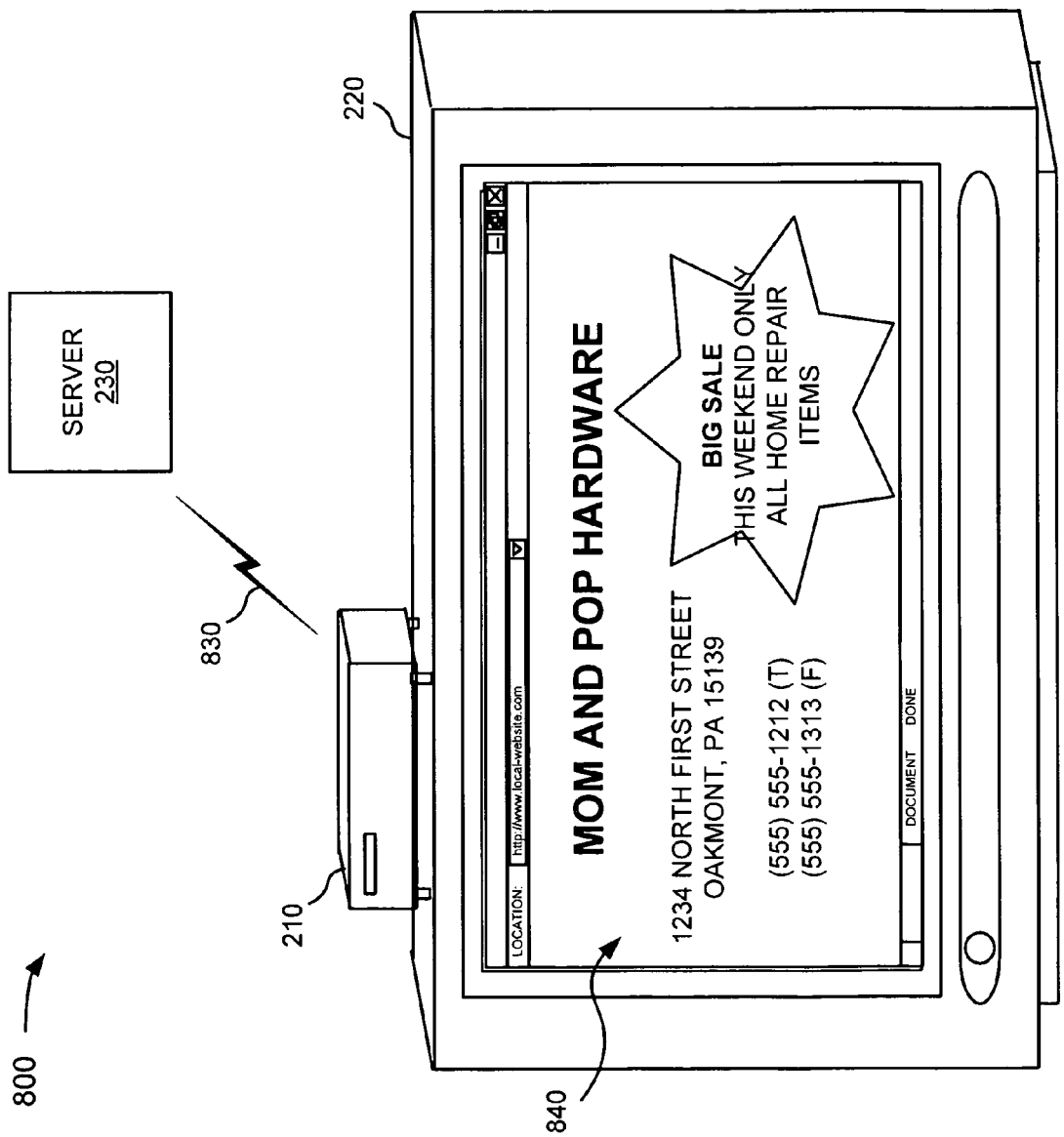

The following examples of FIGS. 7-8B illustrate the processing described above with respect to FIG. 6. In a first example 700 described with respect to FIG. 7, it may be assumed that a user is watching a television commercial for Mom and Pop Hardware, a national hardware chain. Server 230 may use databases 550 and 500 to identify an ad for a local Mom and Pop Hardware store to provide while the television commercial is being provided. For example, server 230 may use an identifier associated with set-top box 210 to determine a location of set-top box 210 from, for example, field 570 of database 550. Server 230 may further use the location of set-top box 210 and information relating to the television commercial (e.g., the name of the business associated with the television commercial) to identify a local ad from, for example, database 500. Thus, with reference to the exemplary entry in database 500 (FIG. 5A) and assuming that the location of set-top box 210 is in zip code 15139, server 230 may identify, based on the name of the business associated with the television commercial and the location of set-top box 210, the local Mom and Pop Hardware store, which is located in the same zip code as set-top box 210, as a business in the vicinity of set-top box 210. Thus, server 230 may retrieve the contents of business information field 540 from database 500 for providing in a local ad.

Server 230 may provide a message 710 to set-top box 210 that causes the local ad to be displayed while the television commercial is playing. Thus, as illustrated in FIG. 7, an ad 720 for a local Mom and Pop Hardware store may be superimposed on top of the television commercial or placed in a position so as not to obscure the user's view of the television commercial. In one embodiment, message 710 may cause multiple local ads to be simultaneously displayed. For example, as illustrated in FIG. 7, message 710 may cause a first ad 720 to be displayed that includes contact information for the local Mom and Pop Hardware store and a second ad 730 to be displayed in a different location in display 220 that includes additional information relating to the local business. In example 700, second ad 730 may include information about a sale at the local Mom and Pop Hardware store. In other embodiments, ads 720 and 730 may be provided in a single location (e.g., as part of a scrolling ad). Selection of local ad 720 or 730 may cause, for example, a telephone call to be placed to the local Mom and Pop Hardware store or a web page for the local Mom and Pop Hardware store to be provided to the user.

As a second example 800 set forth in FIGS. 8A and 8B, it may be assumed that a user is watching a television show, entitled "The Home Repair Show." Server 230 may use databases 550 and 500 to identify a local ad (e.g., that relates to the television show) to provide while the television show is being provided. For example, server 230 may use an identifier associated with set-top box 210 to determine a location of set-top box 210 from field 570 of database 550. Server 230 may further use the location of set-top box 210 and information relating to the television show (e.g., the content of the television show or the category of television show) to identify a local ad from, for example, database 500. Thus, with reference to the exemplary entry in database 500 (FIG. 5A) and assuming that the location of set-top box 210 is in zip code 15139, server 230 may identify, based on the content or category of the television show "The Home Repair Show" and the location of set-top box 210, the local Mom and Pop Hardware store, which is located in the same zip code as set-top box 210, as a business in the vicinity of set-top box and relating to the television show. Thus, server 230 may retrieve the contents of business information field 540 from database 500 for providing in a local ad.

Server 230 may provide a message 810 to set-top box 210 that causes the local ad to be displayed while the television show is playing. Thus, as illustrated in FIG. 8A, a local ad 820 for the local Mom and Pop Hardware store may be superimposed on top of the television show or placed in a position so as not to obscure the user's view of the television show. In example 800, it may be assumed that local ad 820 allows the user to obtain additional information from the Mom and Pop Hardware store's web site. Assume that the user desires additional information about the ongoing sale (identified in local ad 820) and clicks on local ad 820 using, for example, the user's remote control. As a result, set-top box 210 may send a request for the web site to server 230. Server 230 may send a message 830 to set-top box 210 that causes a web page 840 associated with Mom and Pop Hardware store's web site to be displayed on display 220, as illustrated in FIG. 8B.

Embodiments described herein may cause ads for local businesses to be simultaneously displayed with television programming. A server may identify an ad for a local business that relates to television programming being provided to a set-top box and may cause the ad to be provided while the television programming is being provided to the set-top box. In this way, local businesses may advertise to television viewers, without having to incur the cost of expensive commercials.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while a series of acts has been described with respect to FIG. 6, the order of the acts may be varied in other implementations consistent with the invention. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A server comprising:
a memory to store instructions; and
a processor to:
receive information identifying a set-top box,
obtain information identifying a location of the set-top box using the information identifying the set-top box,
select an advertisement to provide to the set-top box using:
the information identifying the location of the set-top box, and
information relating to a television programming that is being provided or will be provided to the set-top box,
the information relating to the television programming including information identifying an entity associated with the television programming, and
the television programming including a television commercial that is associated with a business corresponding to the entity,
the advertisement being associated with the business and being selected based on a location of the business being in a geographical vicinity of the location of the set-top box, and
provide the advertisement to the set-top box for display with the television programming,
the advertisement identifying the business associated with the television programming.

2. The server of claim 1, where the television programming is associated with content, and
where, when selecting the advertisement, the processor is to:
select the advertisement based on the content and the location of the set-top box.

3. The server of claim 1, where, when providing the advertisement to the set-top box, the processor is to:
generate a message that includes the selected advertisement and information relating to a display of the selected advertisement, and
transmit the message to the set-top box.

4. The server of claim 3, where the information relating to the display of the selected advertisement includes information that causes the selected advertisement to be statically displayed while the television programming is being displayed.

5. The server of claim 3, where the information relating to the display of the selected advertisement includes information that causes the selected advertisement to be displayed in a scroll bar while the television programming is being displayed,
where the selected advertisement, displayed in the scroll bar, scrolls while the television programming is being displayed.

6. The server of claim 3, where the information relating to the display of the selected advertisement includes information that causes the selected advertisement to be superimposed on a particular portion of the television programming while the television programming is being displayed.

7. The server of claim 1,
where the selected advertisement, provided for display with the television programming, includes:
information relating to a sale at the business, and
at least one of:
a telephone number of the business, or
a network address of the business.

8. A method comprising:
storing, by a device, in a memory associated with the device:
information identifying a location of another device;
receiving, by the device and from the other device, information identifying the other device, after storing the information identifying the location of the other device;
obtaining, by the device and from the memory, the information identifying the location of the other device using the received information identifying the other device;
selecting an advertisement using:
the obtained information identifying the location of the other device, and
information relating to a television programming that is being provided to the other device or that will be provided to the other device,
the information relating to the television programming including information identifying an entity associated with the television programming,
the television programming including a television commercial that is associated with the entity,
selecting the advertisement including selecting the advertisement that is associated with a location of the entity, that is in a geographical vicinity of the location of the other device, out of a plurality of locations of the entity; and
providing the advertisement to the other device for display with the television programming,
the advertisement including information identifying the entity.

9. The method of claim 8, where the other device includes a set-top box,
where the memory stores information identifying each of a plurality of set-top boxes and information identifying each of a plurality of locations of the plurality of set-top boxes, and
where the information identifying each of the plurality of set-top boxes is associated with the information identifying a corresponding one of the plurality of locations of the set-top boxes.

10. The method of claim 8, where the memory corresponds to a first memory,
where the advertisement is selected from a second memory that stores information relating to businesses, the businesses including a business corresponding to the entity,
where the advertisement is selected based on the stored information relating to the businesses, and
where the stored information relating to the businesses includes:
contact information for the businesses,
information identifying locations of the businesses, and
at least one of:
names of the businesses, or
information identifying business types with which the businesses are associated.

11. The method of claim 8, where the television programming is associated with content, and
where selecting the advertisement includes:
selecting the advertisement based on the content and the obtained information identifying the location of the other device.

12. The method of claim 8, where providing the advertisement to the other device includes:
generating a message that includes the selected advertisement and information relating to a display of the selected advertisement, and
transmitting the message to the other device.

13. The method of claim 12, where the information relating to the display of the selected advertisement includes at least one of:
information that causes the selected advertisement to be statically displayed while the television programming is being displayed, or
information that causes the selected advertisement to be displayed in a scroll bar while the television programming is being displayed.

14. The method of claim 8, where the selected advertisement is associated with a business corresponding to the entity, and
where the method further comprises:
calculating a charge for the business for providing the advertisement, to the other device, during the television programming,
where the charge is calculated based on the television programming, and
where a charge, calculated by the device, for providing the advertisement to the other device during another television programming, that is different than the television programming, is different than the charge calculated for providing the advertisement during the television programming.

15. A system comprising:
a server to:
obtain information relating to television programming that is:
to be provided to a network device, or
being provided to the network device,
the information relating to the television programming including information identifying a location of an entity associated with the television programming,
select an advertisement based on:
a location of the network device, and
the information identifying the location of the entity included in the information relating to the television programming,
the advertisement being associated with the entity, and
the advertisement being selected based on the location of the entity being in a geographical vicinity of the location of the network device, and
provide the selected advertisement to the network device for display with the television programming,
the advertisement including information identifying the entity.

16. The system of claim 15, where, when providing the selected advertisement to the network device, the server is to:
generate a message that includes the selected advertisement and information relating to a display of the selected advertisement, and
transmit the message to the network device.

17. The system of claim 16, where the information relating to the display of the selected advertisement includes at least one of:
information that causes the selected advertisement to be statically displayed while the television programming is being displayed, or
information that causes the selected advertisement to be displayed in a scroll bar while the television programming is being displayed.

18. The system of claim 16,
where the message further includes information that at least one of:
  causes the network device to establish a telephone call to the entity when the advertisement is selected by a user, or
  causes the network device to send a request for a web page, associated with the entity, when the advertisement is selected by a user.

19. The system of claim 15, where the server is further to:
calculate a charge, for the entity, for providing the advertisement to the network device during the television programming,
  where the charge is calculated based on the television programming, and
  where a charge, calculated by the server, for providing the advertisement to the network device during another television programming, that is different than the television programming, is different than the charge calculated for providing the advertisement during the television programming.

20. The system of claim 15, where the selected advertisement, provided for display with the television programming, includes at least one of:
  information relating to a sale at a business associated with the entity,
  a telephone number of the business, or
  a network address of the business.

* * * * *